United States Patent [19]
Guerra

[11] Patent Number: 5,873,488
[45] Date of Patent: Feb. 23, 1999

[54] VIAL GRIPPER MECHANISM

[75] Inventor: Lawrence E. Guerra, Roeland Park, Kans.

[73] Assignee: ScriptPro, LLC, Mission, Kans.

[21] Appl. No.: 897,184

[22] Filed: Jul. 21, 1997

[51] Int. Cl.⁶ ................................................ B65H 47/00
[52] U.S. Cl. ................................. 221/220; 221/2; 221/7; 221/219; 294/104; 294/907; 901/34; 901/39
[58] Field of Search ................................. 221/2, 7, 219, 221/220; 294/104, 907; 901/34, 39

[56] References Cited

U.S. PATENT DOCUMENTS

| | | | |
|---|---|---|---|
| 4,284,301 | 8/1981 | Geiger et al. | 294/104 |
| 4,753,473 | 6/1988 | Arnett | 901/39 |
| 4,872,803 | 10/1989 | Asakawa | 901/34 |
| 5,033,785 | 7/1991 | Woolley, Jr. | 294/104 |
| 5,082,268 | 1/1992 | Santoro | 221/220 |
| 5,332,275 | 7/1994 | Conway et al. | 901/39 |
| 5,337,919 | 8/1994 | Spaulding et al. | 221/2 |

FOREIGN PATENT DOCUMENTS

| | | | |
|---|---|---|---|
| 53-145260 | 12/1978 | Japan | 294/907 |
| 918-086 | 4/1982 | U.S.S.R. | 294/907 |

Primary Examiner—William E. Terrell
Assistant Examiner—Patrick Mackey
Attorney, Agent, or Firm—Hovey, Williams, Timmons & Collins

[57] ABSTRACT

In an automatic medicament dispensing machine, a vial gripper mechanism includes a rotatable first jaw and a second jaw coupled with the output shaft of a jaw motor. In an open position, the jaws are spaced for receiving a medicament vial therebetween. Actuation of jaw motor rotates the second jaw toward the first jaw for gripping the vial therebetween in a gripping position. Continued rotation of the jaw motor causes rotation of both of said jaws and any vial gripped therebetween to a dispensing position for receipt of medicament into the vial from an adjacent dispensing cell.

9 Claims, 4 Drawing Sheets

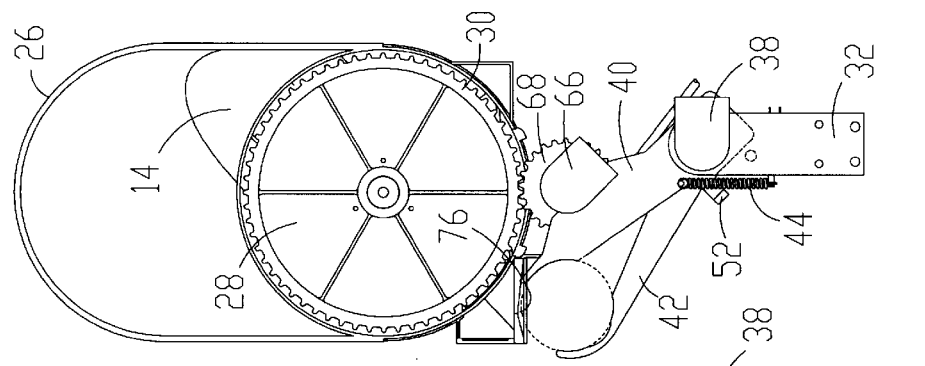
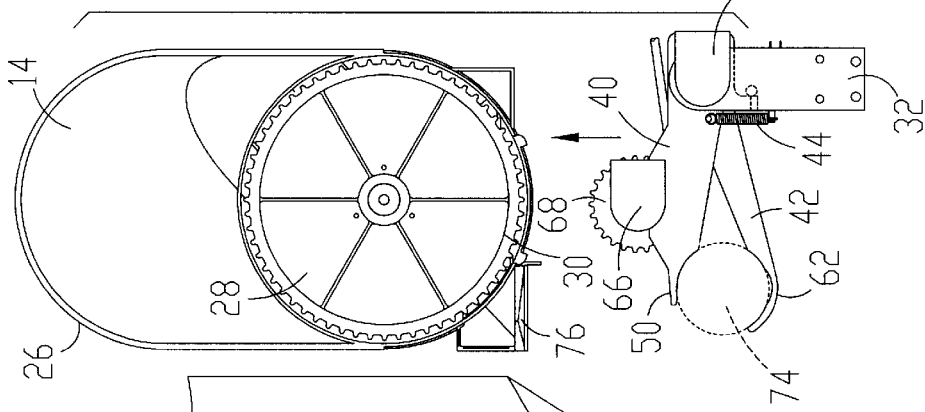
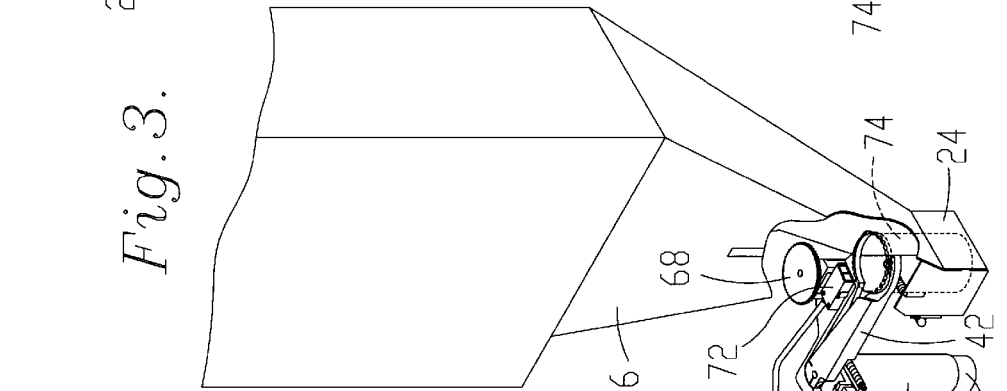
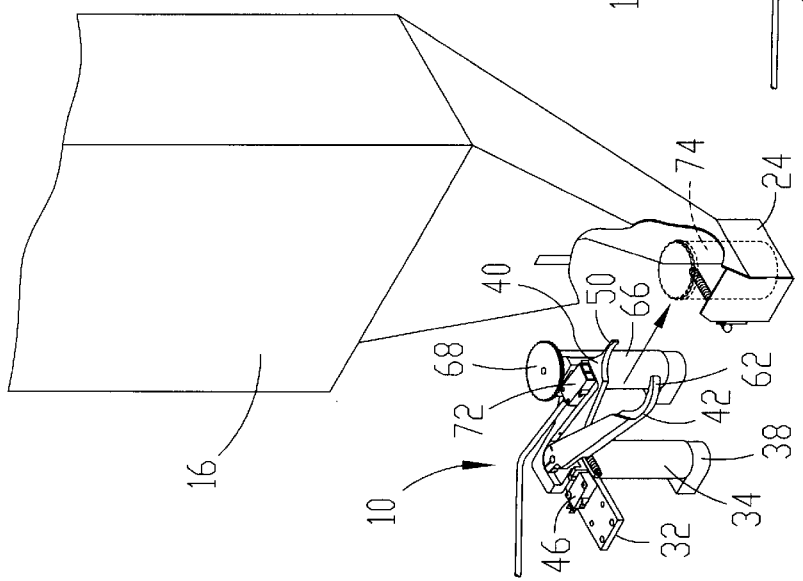

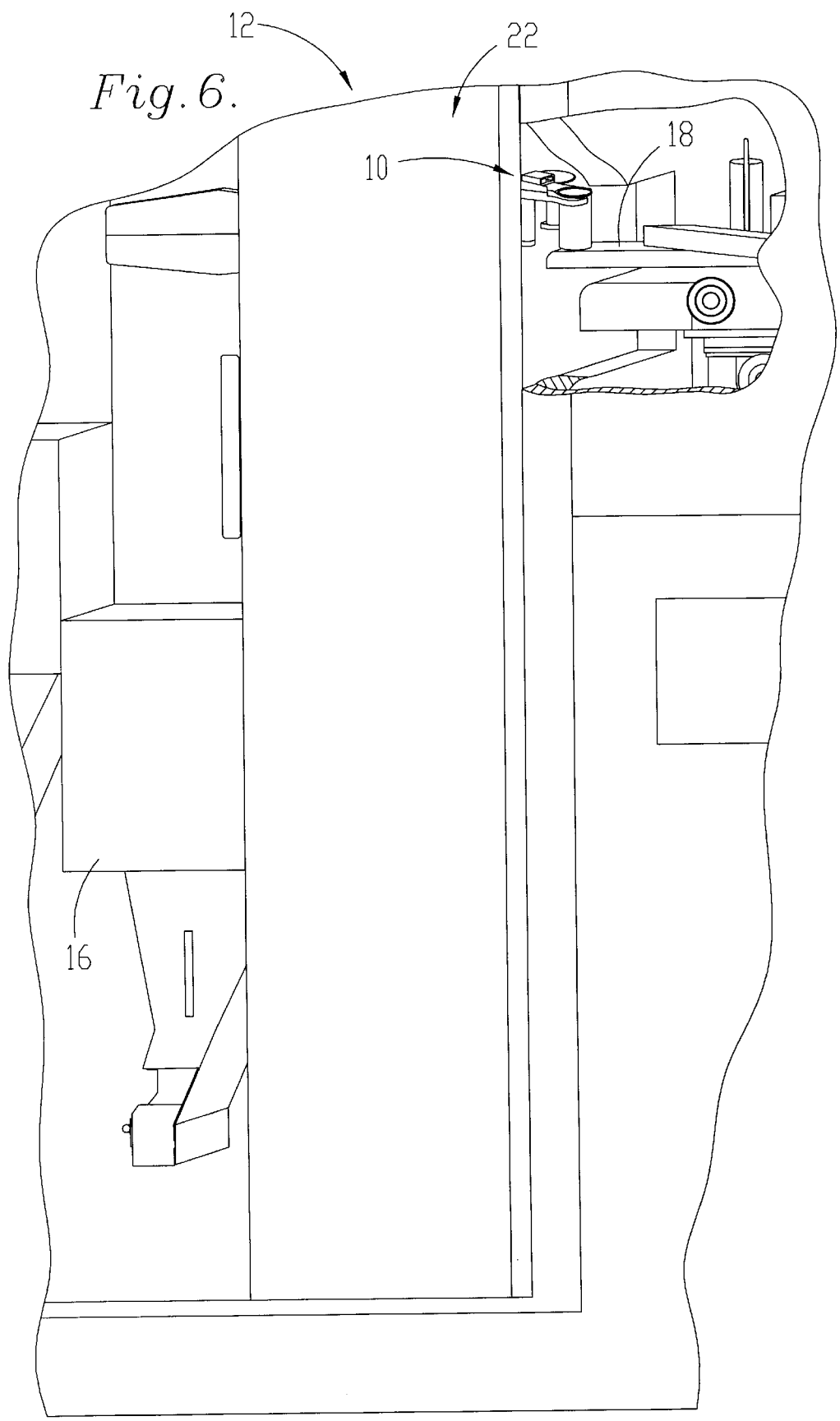

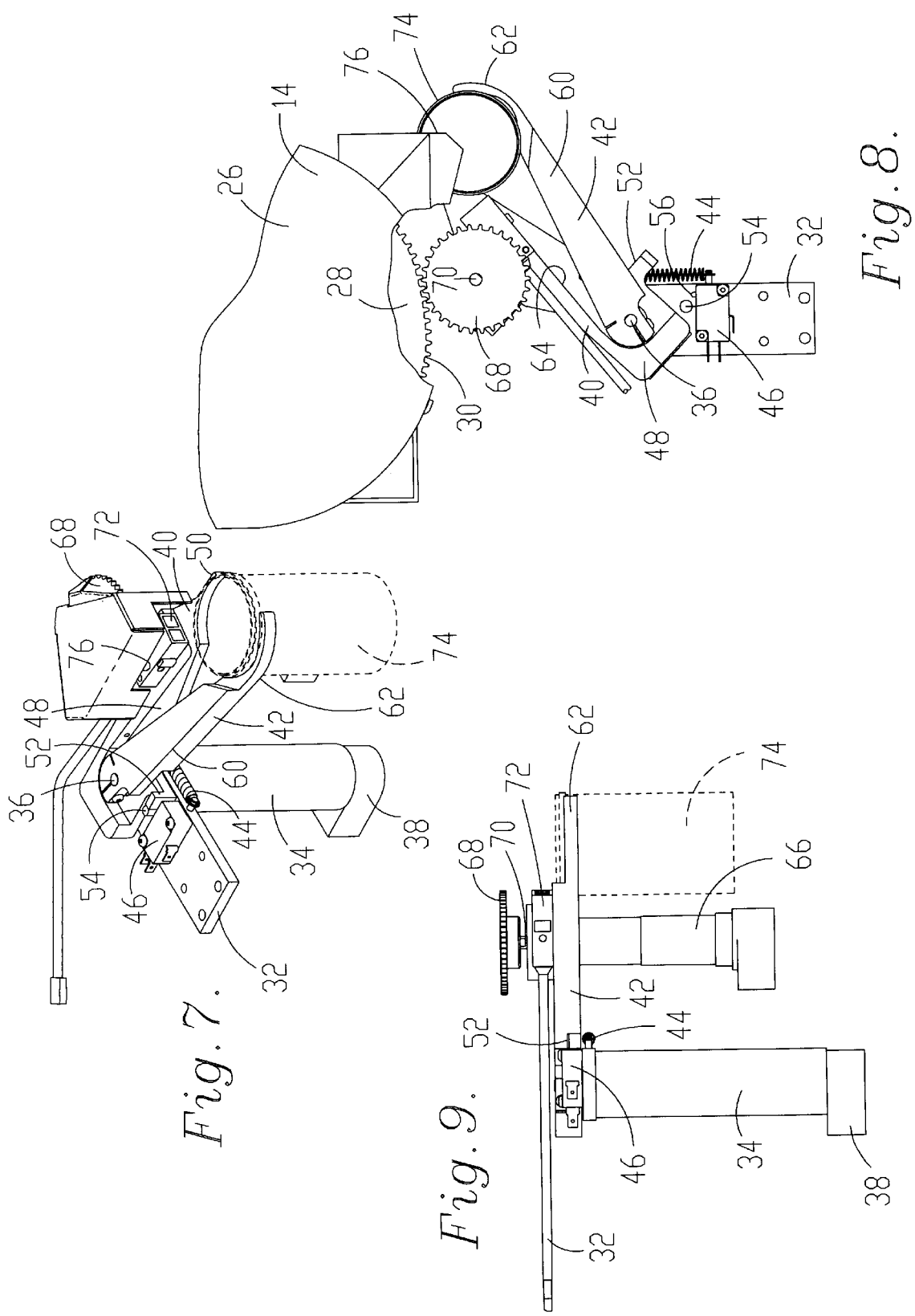

VIAL GRIPPER MECHANISM

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

The present invention is concerned with the field of automatic medicament dispensing machines. In particular, the invention is concerned with a vial gripper mechanism for use in such a machine including a rotatable first jaw and a second jaw coupled with the output shaft of a jaw motor.

2. Description of the Prior Art

In the prior art, U.S. Pat. No. 5,337,919 discloses an automatic medicament dispensing machine having a plurality of medicament dispensing cells arranged in rows and vertical columns. A manipulator mechanism translates across the face of the cells for positioning a vial adjacent a selected cell for receipt of medicament therefrom. The mechanism includes a rotatable gripper finger coupled with a stationary gripper finger for holding a vial therebetween.

The gripper assembly of the '919 patent does not include the ability to determine whether a vial is present. If a vial is dislodged from the gripper fingers, the machine continues to operate as if a vial were present thereby presenting a malfunction in machine operation. Moreover, vials in different sizes are often needed and the gripper assembly of the '919 patent does not have the ability to determine the size of a vial being gripped between the fingers thereby limiting the utility of this assembly.

SUMMARY OF THE INVENTION

The present invention solves the prior art problems discussed above and presents a distinct advance in the state of the art. In particular, the vial gripper apparatus hereof enables the determination of the presence of a vial and the size thereof.

The preferred vial gripper apparatus includes a rotatable first jaw and a second jaw coupled with the output shaft of a jaw motor with these components preferably connected to the manipulator mechanism of an automatic medicament dispensing machine. In an open position, the jaws are spaced for receiving a vial therebetween. Actuation of the jaw motor causes rotation of the second jaw toward the first jaw thereby gripping the vial therebetween in the gripping position. Continued rotation of the second jaw causes rotation of the first jaw and any vial therebetween to a dispensing position for dispensing of medicament into the vial from an adjacent dispensing cell.

In preferred forms, the jaw motor includes a rotary encoder for measuring the rotation of the output shaft and thereby rotation of the second jaw. A spring biases the first jaw toward a home position and the first jaw actuates a position switch when in the home position. As the second jaw rotates toward the first vial and engages a vial, continued rotation causes the first jaw to leave its home position and release the position switch. The release of the position switch marks the gripping position. The amount of rotation of the second jaw from the home position to the gripping position as measured by the encoder indicates the diameter of the vial.

BRIEF DESCRIPTION OF THE DRAWINGS

FIG. 2 is a perspective view of the apparatus of FIG. 1 shown in the open position for receiving a vial from a vial dispenser;

FIG. 3 is similar to FIG. 2 but showing the apparatus in the gripping position gripping a vial;

FIG. 4 is a bottom plan view of the apparatus of FIG. 1 shown in the gripping position and adjacent a dispensing cell;

FIG. 5 is a view similar to FIG. 4 but showing the apparatus in the dispensing position;

FIG. 6 is a partial front elevational view of the machine of FIG. 1 with portions cut away for clarity showing the apparatus in the gripping position placing a vial on a conveyor;

FIG. 7 is a perspective view of the apparatus of FIG. 1 shown in the dispensing position adjacent a dispensing cell and holding a vial shown in phantom lines;

FIG. 8 is a top plan view of the apparatus of FIG. 7; and

FIG. 9 is a side elevational view of the apparatus of FIG. 7.

DETAILED DESCRIPTION OF THE PREFERRED EMBODIMENT

Figure 1:
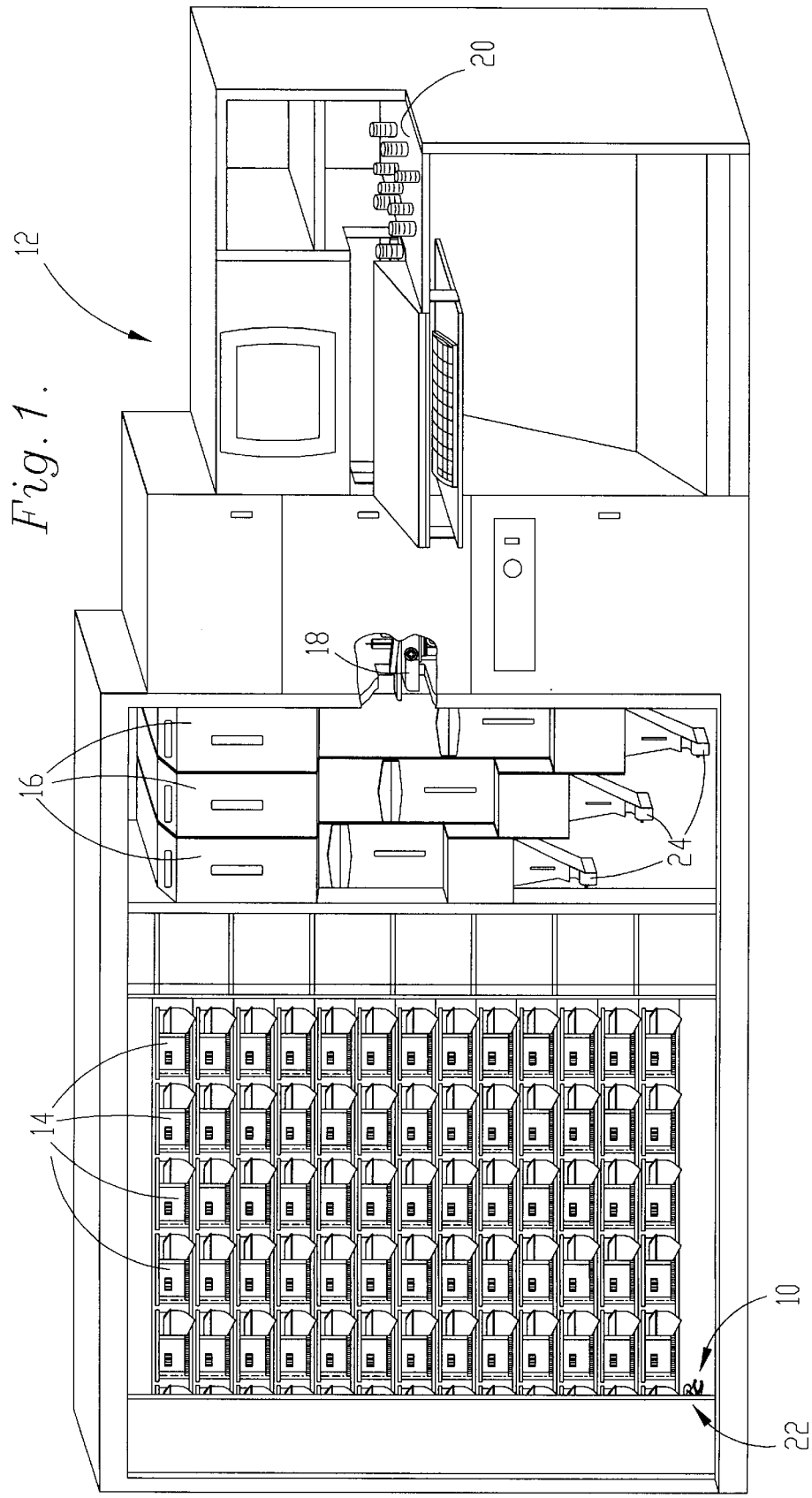
FIG. 1 is a front elevational view illustrating the preferred vial gripper apparatus in accordance with the present invention shown in use with an automatic medicament dispensing machine.

FIG. 1 illustrates preferred vial gripper apparatus 10 in accordance with the present invention shown in the preferred environment of use as part of an automatic medicament dispensing machine 12 such as that illustrated in U.S. Pat. No. 5,337,919, incorporated herein by reference as part the disclosure hereof. As shown, machine 12 includes a plurality of medicament dispensing cells 14, a plurality of vial dispensers 16 for dispensing empty vials, a discharge conveyor 18 for conveying filled vials through a labeler to a discharge station 20, and a manipulator mechanism 22, all controlled by a microcomputer (not shown) under the direction of computer programming.

As illustrated in FIGS. 2 and 3, a vial dispenser 16 includes a cage 24 for holding an empty vial. FIGS. 4–5 and 8 illustrate a dispensing cell having a housing 26 equipped with a dispensing wheel 28 connected to a driven gear 30. In general operation, manipulator mechanism 22 retrieves an empty vial from a selected vial dispenser 16, places it adjacent a selected one of the dispensing cells 14, actuates the cell to dispense a predetermined amount of medicament therefrom into the vial, and then places the filled vial on discharge conveyor 18.

As illustrated in FIGS. 2–9, preferred vial gripper apparatus 10 includes support plate 32, jaw motor 34 (Model ECO 32-060-36 EAB 200B by Maxon) with rotatable output shaft 36 extending therefrom, rotary encoder 38 (Model HP HEDS-5540-A12 by Hewlett Packard), rotatable, first vial gripper jaw 40, second vial gripper jaw 42, biasing spring 44 and position switch 46. Support plate 32 is configured for coupling with the manipulator mechanism 22 of machine 12 for selective positioning thereby under the direction of the program controlled microcomputer.

Jaw motor 34 is coupled with the lower face of support plate 32 with output shaft 36 extending therethrough to the upper side thereof. Rotary encoder 38 is coupled with the lower end of jaw motor 34 and provides output pulses to the microcomputer of machine 12 representative of the rotation of output shaft 36.

First jaw 40 presents a base section 48 and an arcuate gripper section 50 configured for engaging the side of a medicament vial. Base section 48 receives output shaft 36 therethrough but is free to rotate relative to shaft 36 which acts as a pivot allowing first jaw 40 to rotate. Biasing spring 44 interconnects support plate 32 and first jaw 40 and biases first jaw 40 clockwise toward the home position illustrated in FIG. 7.

In the home position, tab 52, extending from first jaw 40, engages stop 54 extending upwardly from support plate 32. This prevents first jaw 40 from rotating beyond the home position.

Also in the home position, first jaw 40 actuates position switch 46 by engaging switch operator 56 (see FIG. 8) extending therefrom. Position switch 46 is connected to the microcomputer of machine 12 and actuation of switch 46 indicates and confirms that first jaw 40 is in the home position.

Second jaw 42 presents base portion 60 and arcuate gripper portion 62 configured for engaging the side of a medicament vial and complemental with gripper section 50 of first jaw 40. Base portion 60 is received in recessed area 64 defined in first jaw 40. This configuration positions first jaw gripper section 50 and second jaw gripper portion 62 for movement in the same plane in order to grip a vial therebetween, as illustrated in FIG. 9. Base portion 60 receives that portion of output shaft 36 extending above first jaw recessed area 64 and is clamped to output shaft 36 for rotation therewith. That is, rotation of output shaft 36 causes second jaw 42 to rotate, but first jaw 40 is not clamped to output shaft 36 and thereby rotates freely relative thereto.

Apparatus 10 also includes drive gear motor 66 coupled with the lower face of first jaw 40 and drive gear 68 coupled with motor shaft 70 of motor 66 extending through the upper face of first jaw 40. Motor 66 is controlled by the microcomputer of machine 12. Also, photoelectric eye 72 is mounted to the upper face of first jaw 40 adjacent gripper section 50 and positioned for counting medicament units dispensed into a vial gripped between gripper section 50 and gripper portion 62 of jaws 40, 42 respectively.

In the preferred mode of operation of apparatus 10 as a component of machine 12, the relative positions of jaws 40 and 42 are initially calibrated. This is accomplished by actuating jaw motor 44 to rotate second jaw 42 counterclockwise toward first jaw 40 without any vial therebetween. Second jaw 42 continues to rotate until it engages first jaw 40. This action causes first jaw 40 to rotate away from its home position thereby releasing position switch 46.

The operation of jaw motor 34 is then stopped and its direction reversed in order to rotate second jaw 42 clockwise away from first jaw 40 for a predetermined number of pulse counts provided by rotary encoder 38. This predetermined number corresponds to the open position and to a predetermined spacing between jaws 40, 42 as illustrated in FIG. 2. In the open position, the spacing between gripper section 50 and gripper portion 62 is sufficient to receive the largest of the vials supplied by vial dispensers 16.

In normal operation, an empty vial 74 is retrieved from one of the vial dispensers 16. Manipulator mechanism 22 moves apparatus 10 toward the cage 24 of the selected vial dispenser 16 with jaws 40, 42 in the open position as illustrated in FIG. 2. After jaws 40, 42 are in position with vial 74 between gripper section 50 and gripper portion 62, jaw motor 34 is actuated to rotate second jaw 42. During this rotation, jaw 42 engages the side of vial 74 which in turn engages first jaw 40. Jaw 42 continues to rotate until first jaw 40 rotates and releases position switch 46. This marks the gripper position of jaws 40, 42 as illustrated in FIGS. 3 and 4 and jaw motor 34 is stopped.

The number of pulse counts provided by rotary encoder 38 during rotation of second jaw 42 indicates whether a vial is present between jaws 40, 42 and indicates the size of any vial that is present such as vial 74. For example, if vial 74 presents a large diameter, jaw 42 will rotate only a few pulse counts as provided by encoder 38 before position switch 46 is released by first jaw 40 moving from its home position. If vial 74 presents a smaller diameter, a greater number of pulse counts will be provided with the number of pulse counts indicating the exact diameter of vial 74. Moreover, if a vial is not present, the maximum number of pulse counts will be present as determined in the calibration procedure. This indicates that no vial is present.

With apparatus 10 gripping vial 74 in the gripping position, mechanism 22 then positions apparatus 10 adjacent a selected one of dispensing cells 14 corresponding to the selected medicament. Jaw motor 34 is then actuated to continue the rotation of second jaw 42 in the counterclockwise direction to the dispensing position illustrated in FIGS. 7 and 8. FIG. 5 also illustrates the dispensing position as a bottom plan view. The dispensing position is determined by rotating second jaw 42 and thereby first jaw 40 and vial 74 therebetween by a predetermined number of pulse counts as provided by rotary encoder 38.

In the dispensing position, vial 74 is positioned adjacent selected dispensing cell 14 and beneath medicament outlet 76. Also in this position, drive gear 68 engages driven gear 30 of dispensing cell 14. Drive gear motor 66 is then actuated which rotates drive gear 66 and driven gear 30 and causes units of medicament to be dispensed from cell 14 into vial 74. Photoelectric eye 72 is positioned to count the number of medicament units dispensed into vial 74. When the prescribed number of units has been dispensed, drive gear motor 66 is then stopped and jaw motor 34 actuated to rotate second jaw 42 to the gripper position. The bias provided by biasing spring 44 keeps vial 74 securely held between jaws 40, 42.

Manipulator mechanism 42 next shifts and positions filled vial 74 just above discharge conveyor 18. Jaw motor 34 is then actuated to rotate second jaw 42 clockwise to the open position. This releases vial 74 onto conveyor 18.

As those skilled in the art will now appreciate, apparatus 10 provides a reliable and mechanically simple way to handle medicament vials in an automatic medicament dispensing machine. In particular, preferred apparatus 10 enables the determination of whether a vial is present and the size of that vial using structure that is mechanically simple and reliable. Those skilled in the art will also appreciate that the present invention encompasses many variations in the preferred embodiment described herein.

Having thus described the preferred embodiment of the present invention, the following is claimed as new and desired to be secured by Letters Patent:

1. In an automatic medicament dispensing machine having a plurality of selectively actuatable medicament dispensing cells and a manipulator mechanism operable for positioning a vial adjacent a selected one of the cells and for actuating the selected cell in order to dispense medicament therefrom into the vial, a vial gripper apparatus comprising:

a first vial gripper jaw;

a second vial gripper jaw; and coupling means rotatably coupling said jaws with the manipulator mechanism and positioning said jaws for rotation toward and away from one another, said coupling means including motor means including a selectively actuatable jaw motor having a rotatable output shaft coupled with said second jaw for rotating said second jaw from an open position, in which said jaws are spaced for receiving a vial therebetween, toward said first jaw for engaging and gripping a vial therebetween in a gripping position, and for further rotating said second jaw in order to cause rotation of said first jaw therewith along with a vial gripped therebetween beyond said gripping position to a dispensing position in which the vial is positioned for receipt of medicament from an adjacent dispensing cell.

2. The apparatus as set forth in claim 1, said motor means including means for determining the amount of rotation of said second jaw from said open position to said gripper position, such being indicative of whether a vial is present between said jaws and indicative of the size of a vial present between said jaws.

3. The apparatus as set forth in claim 2, said means for determining including an encoder coupled with said motor for measuring the rotation of said output shaft, such being indicative of the rotation of said second jaw.

4. The apparatus as set forth in claim 3, said means for determining further including switch means positioned for actuation by said first jaw upon rotation thereof induced by said second jaw wherein actuation of said switch means indicating said jaws in said gripper position.

5. The apparatus as set forth in claim 1, said jaws having respective axes of rotation with said axes being coincident.

6. The apparatus as set forth in claim 5, said first jaw being coupled about said output shaft and rotatable relative thereto.

7. The apparatus as set forth in claim 1 further including biasing means biasing said first jaw toward said second jaw.

8. The apparatus as set forth in claim 7, said biasing means including a spring.

9. The apparatus as set forth in claim 7 further including a stop for limiting the rotation of said first jaw under the bias of said biasing means.

\* \* \* \* \*